United States Patent [19]

Hying et al.

[11] Patent Number: 5,435,523
[45] Date of Patent: Jul. 25, 1995

[54] TRAILER TONGUE JACK

[75] Inventors: Clement F. Hying; Jay M. Klubertanz, both of Menomonee Falls; Roger J. Jones, Fond du Lac, all of Wis.

[73] Assignee: Wesbar Corporation, West Bend, Wis.

[21] Appl. No.: 328,380

[22] Filed: Oct. 25, 1994

[51] Int. Cl.6 .................................................. B60S 9/02
[52] U.S. Cl. .................... 254/420; 254/425; 254/418
[58] Field of Search ............... 254/420, 425, 424, 418, 254/103

[56] References Cited

U.S. PATENT DOCUMENTS 4,623,125 11/1986 Ebey ..................................... 254/418
5,067,692 11/1991 Nudd et al. ........................ 254/420

*Primary Examiner*—Robert C. Watson
*Attorney, Agent, or Firm*—Andrus, Sceales, Starke & Sawall

[57] ABSTRACT

An improved trailer tongue jack including an outer tube and an inner tube which is slidable within the outer tube. The lower end of the inner tube carries a terrain engaging member, such as a caster wheel or sand shoe. A nut is mounted within the inner tube and is threaded on a screw and the upper end of the screw carries a bevel gear which meshes with a second bevel gear mounted on a handle. The bevel gears are supported within a polymeric cup mounted in the upper end of the outer tube and the cup also serves to rotatably support the handle as well as the upper end of the screw and further functions, along with a thrust washer, as a thrust bearing for the screw. The jack also includes an improved locking mechanism for locking the jack in either a vertical or horizontal position. A U-shaped swivel bracket is secured to the outer surface of the outer tube and the lower end portion of a locking member is mounted for movement within aligned openings in flanges of the swivel bracket. The upper end of the locking member is engageable with a hole in a mounting bracket secured to the trailer tongue to lock the jack in position relative to the tongue. A torsion spring associated with the lower end portion of the locking member serves to bias the locking member to the locking position.

15 Claims, 2 Drawing Sheets

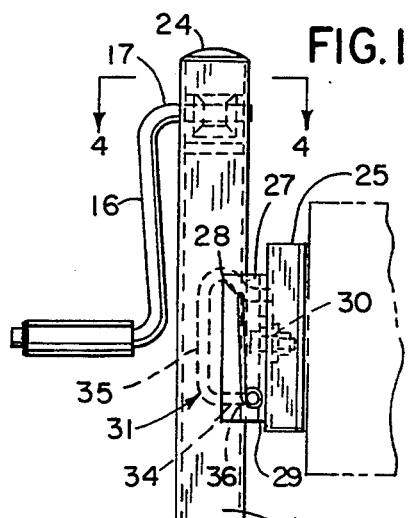
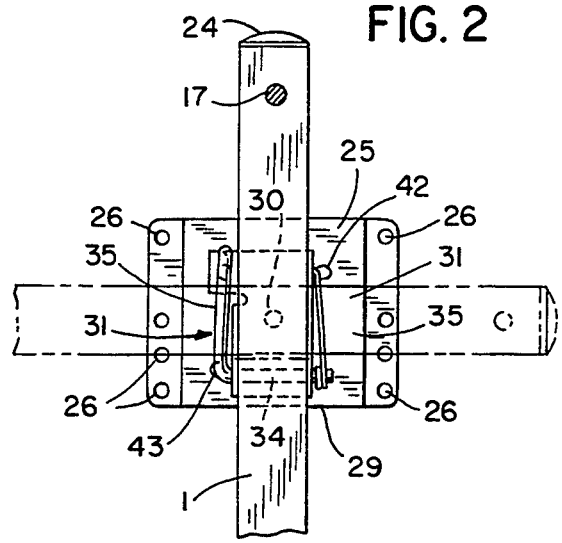
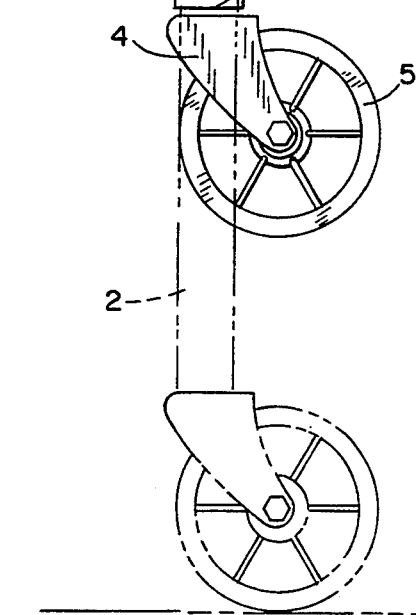
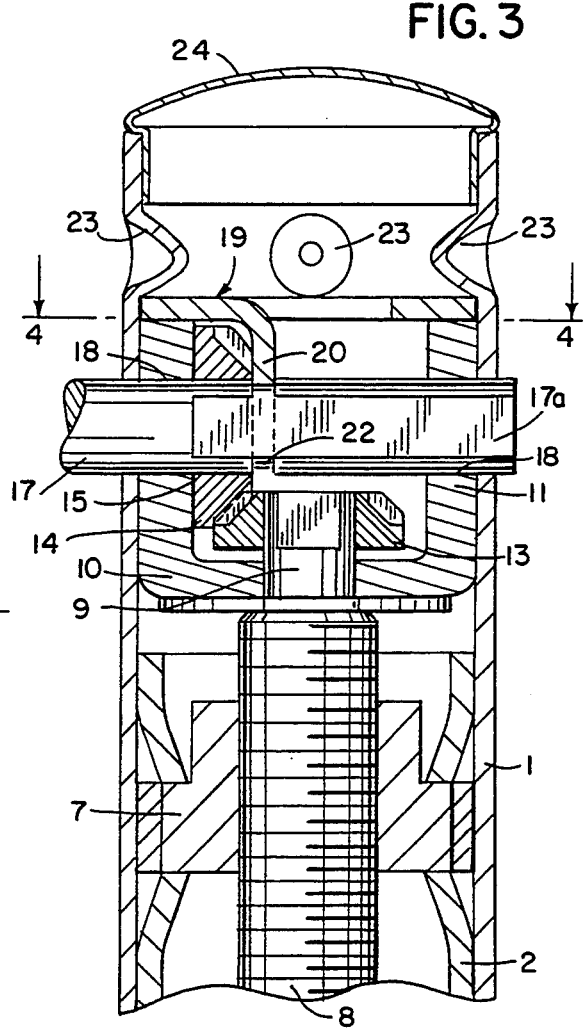
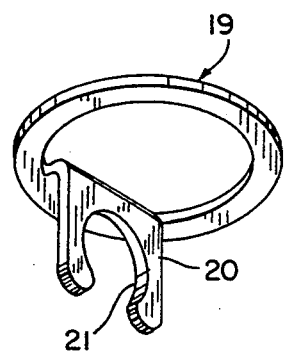

TRAILER TONGUE JACK

BACKGROUND OF THE INVENTION

Trailer tongue jacks are employed to raise and lower a trailer tongue, such as a boat trailer tongue, to facilitate hitching of the trailer to a vehicle. The typical tongue trailer jack also includes a supporting caster wheel so that when the trailer is unhitched from the vehicle, the jack will support the tongue, and the caster wheel will facilitate movement of the trailer over the ground. In some instances a sand shoe may be used in place of the caster wheel to support the trailer tongue on soft terrain.

The conventional jack construction includes an outer elongated tube and an inner tube which is mounted for telescopic sliding movement within the outer tube. The lower end of the inner tube is connected through a swivel to a caster wheel or sand shoe.

To move the inner tube and caster wheel or sand shoe relative to the outer tube, a nut is secured within the upper end of the inner tube and is engaged with an elongated screw. In a common type of jack, the upper end of the screw extends through an opening in a U-shaped bracket that is mounted within the upper end of the outer tube and a bevel gear is secured to the end of the screw. The bevel gear meshes with a second bevel gear located with the U-shaped bracket and the second bevel gear is driven by rotation of a manually operated handle. With this construction, rotation of the handle will operate through the bevel gears to rotate the screw and thereby move the nut and inner tube up and down relative to the outer tube. As the outer tube is connected to the trailer tongue, lowering of the inner tube and caster wheel relative to the outer tube will lift the trailer tongue, and conversely, upward movement of the inner tube and caster wheel relative to the outer tube will lower the trailer tongue.

The typical drive mechanism for the jack as used in the past has required a number of separate components. More specifically, bushings are utilized to journal the handle in both flanges of the U-shaped bracket and an additional bushing is required to journal the screw relative to the bottom surface or web of the bracket. Further, the typical construction as used in the past has included a thrust bearing mounted on the upper end of the nut in position to engage the bottom surface of the bracket.

In addition, the conventional construction has employed retaining pins to retain the handle within the bracket and also to retain the bevel gears on the screw and handle. The use of the bushings, thrust bearing and pins contributed substantially to the overall cost of the jack.

The typical trailer tongue jack also includes a provision for pivoting the jack, once the trailer is hitched and the caster wheel is elevated out of contact with the ground, to a generally horizontal storage position so that the jack will not interfere with travel of the vehicle or trailer. The typical mechanism for providing this pivoting action has consisted of a swivel bracket which is secured to the outer surface of the outer tube of the jack and a mounting plate, which is attached to the trailer tongue and is connected to the swivel bracket through a pivot. The jack can be locked in either a vertical or horizontal position by a spring loaded locking pin that is mounted on the swivel bracket and is engageable within a hole in the mounting plate on the tongue. To pivot the jack, two handed operation is required, with one hand releasing the spring loaded locking pin and the other hand then pivoting the jack to the horizontal storage position.

SUMMARY OF THE INVENTION

The invention is directed to an improved trailer tongue jack having a simpler and less expensive construction than jacks as used in the past.

In accordance with the invention, the jack comprises an outer elongated tube and an inner tube which is mounted for sliding movement within the outer tube. A terrain engaging member, such as a caster wheel or sand shoe is connected to the lower end of the inner tube through a swivel connection, or by direct welding to the tube.

To move the inner tube relative to the outer tube, a screw and nut mechanism is utilized in which a nut is secured within the upper end of the inner tube and is threaded to a elongated screw which extends coaxially of the inner tube. Located within the upper end of the outer tube is a cup shaped member preferably formed of a polymeric material. The upper reduced diameter end of the screw extends through an opening in the bottom surface of the cup member and is secured to a bevel gear which engages a second bevel gear that is mounted on a flat in the side wall of the cup member.

The upper horizontal end of a handle extends through aligned openings in the side walls of the cup member and is secured to the second bevel gear. With this construction, rotation of the handle will act through the bevel gears to rotate the screw, thereby driving the nut up and down and correspondingly moving the inner tube and caster wheel relative to the outer tube.

To prevent axial displacement of the upper end of the handle from the cup member, a retaining collar is located within the upper end of the outer tube and is supported on the upper end of the cup. The collar is provided with a downwardly extending tab having a notch which is received within a groove in the upper horizontal section of the handle, thus preventing the handle from being pulled out of the cup and outer tube.

The polymeric cup member provides a multiple function in that it not only supports the bevel gears but also serves to journal both the handle and screw for rotation and the lower surface of the cup further serves as a thrust bearing for the nut.

As a further feature, the invention includes a novel and improved locking mechanism for locking the jack in both the vertical supporting position and a horizontal storage position. In this regard a generally U-shaped swivel bracket is secured to the outer surface of the outer tube and is pivotally connected through a pivot pin to a mounting plate that is attached to the trailer tongue. The pivotal connection permits the mounting bracket and jack to be pivoted between the vertical support position and the horizontal storage position and a locking member is utilized to lock the jack in either position.

The locking member includes a lower horizontal section which is mounted for pivotal movement in the spaced flanges of the swivel bracket that is attached to the jack. The locking member also includes an elongated central section which extends upwardly at an angle to the upper section, and the central section terminates in an upper section which is adapted to be received within an opening in the mounting plate on the trailer tongue, thereby locking the swivel bracket to the mounting plate.

To release the locking connection, the operator grasps the central portion of the locking member and pulls rearwardly, thereby disengaging the upper end of the locking member with the mounting plate on the trailer tongue. With the locking member released, the operator can then pivot the jack-with the same hand so that only one hand operation is required to release the locking member and pivot the jack to the storage position.

The invention provides a simple and less costly jack construction as compared to jacks used in the past. Because of the fewer number of parts that are required, assembly of the jack is facilitated.

The use of the polymeric cup member provides multiple functions and eliminates the need of separate bushings, thrust bearings and pins as used in jack constructions of the past.

The locking mechanism requires only one hand operation to release the locking member and pivot the jack between the vertical and horizontal positions.

Other objects and advantages will appear in the course of the following description.

DESCRIPTION OF THE DRAWINGS

The drawings illustrate the best mode presently contemplated for carrying out the invention.

In the drawings:

FIG. 1 is a side elevation of the jack invention with parts broken away in section;

FIG. 2 is a fragmentary side elevation of the jack;

FIG. 3 is an enlarged vertical section of the upper end of the jack showing the cup member and the bevel gears;

FIG. 5 is a perspective view of the retaining collar;

DESCRIPTION OF THE ILLUSTRATED EMBODIMENT

Figure 4:
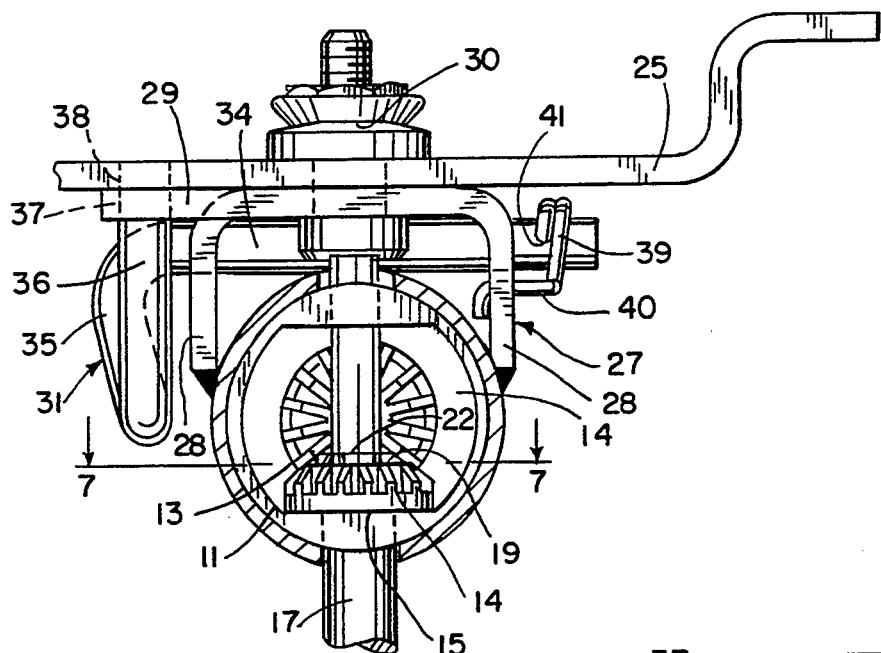
FIG. 4 is a section taken along line 4—4 of FIG. 1.

The drawings illustrate an improved trailer tongue jack including an outer tubular member 1 and an inner tubular member 2 which is mounted for sliding movement within the outer member 1. The lower end of inner tube 2 is connected through a swivel 3, or direct welding to a U-shaped bracket 4 that carries a terrain engaging member, such as a caster wheel 5, or alternately a sand shoe. By virtue of the swivel connection, the caster wheel 5 can pivot universally relative to the inner tube 2.

To move the inner tube 2 axially relative to the outer tube, a nut 7 is secured within the upper end of the inner tube, as best shown in FIG. 3. Nut 7 is threaded on an elongated screw 8 which is mounted concentrically within tubes 1 and 2. As seen in FIG. 3, the upper reduced diameter end 9 of screw 8 extends through an opening in the bottom wall 10 of a cup shaped member 11. Cup member 11 is preferably composed of a polymeric material such as an acetal resin. The lower surface of bottom wall 10 of cap member 11 rests on a washer 12 that is supported on an annular shoulder on screw 9.

Mounted on the end 9 of screw 8 is a bevel gear 13 which is engaged with a second bevel gear 14 that is mounted on a flat 15 on the inner surface of cup member 11.

A manually operated handle 16 is connected to gear 14, and as shown in FIG. 4 the upper horizontal section 17 of the handle extends through aligned openings in outer tube 1 as well as through a pair of aligned openings 18 in the side wall of cup member 11 and is connectedto bevel gear 14. To provide a driving connection between handle 16 and bevel gear 14, the handle section 17 is provided with a pair of opposed flats 17a and the opening in the bevel gear 14 has a similar configuration, including a pair of opposed flats which engage the flat 17a. Thus, rotation of handle 16 will rotate bevel gear 14 and this rotation is transmitted through bevel gear 13 to screw 8, causing nut 7 to move either up or down on the screw and correspondingly moving the inner tube 2 relative to the outer tube 1.

To prevent the handle section 17 from being axially displaced from bevel gear 14 and holes 18, a retaining collar 19 is positioned on the upper end of the cup member 11. Collar 19, as best seen in FIG. 5, is provided with a downwardly extending tab 20 that defines a notch 21, and the notch engages a circumferential groove 22 in the handle portion 17. The engagement of the notch 21 with groove 22 prevents the handle section 17 from being axially displaced from the bevel gear 14 and cup member 11.

The collar 19 is retained within the upper end of outer tube 1 by a plurality of inwardly projecting dimples 23 which are located immediately above the collar. A cap 24 can be applied to the open upper end of tube 1, as shown in FIG. 4.

Cup member 11 provides multiple functions. Cup member 11 serves to support the bevel gears 13 and 14 and the openings 18 serve to journal the handle for rotation thus, eliminating the need for bushings that are normally employed. Further, the upper end 9 of screw 8 is journaled within the opening of the bottom surface of cup member 11, and shoulder 12 on screw 8 is engaged with bottom wall 10 thus, functioning as a thrust bearing.

The invention also includes an improved mechanism for attaching the jack to the trailer tongue. A tongue mounting bracket 25 having a generally U-shaped configuration is attached by clamps or by welding to the trailer tongue. The side portions of bracket 25 are formed with a series of holes 26 and bolts extend through the holes 26, as well as through aligned holes in a mounting bar attached to the tongue, and receive nuts, thereby mounting the bracket 25 to the trailer tongue.

Figure 6:
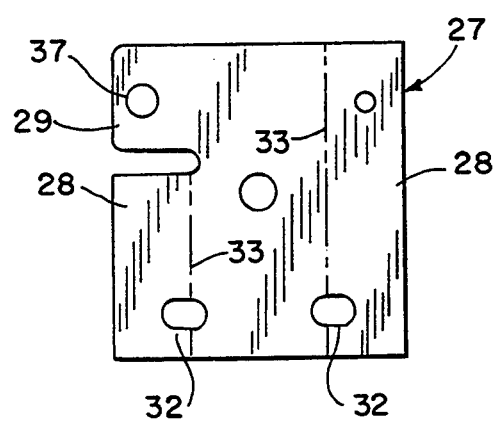
FIG. 6 is a plan view of the swivel bracket before bending.
Figure 7:
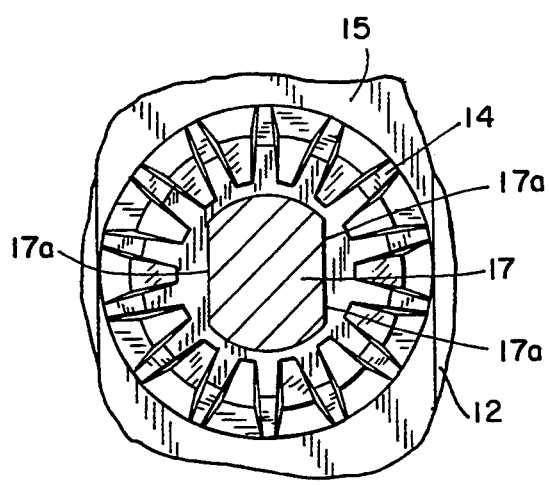
FIG. 7 is a section taken along line 7—7 of FIG. 4.

A swivel bracket 27 is formed with a pair of spaced vertical flanges 28 which are connected, preferably by welding, to the outer surface of tube 1. In addition, an extension 29 extends laterally from the upper portion of one of the sides of bracket 27 as best shown in FIGS. 2 and 6.

Bracket 27 is pivotally connected to bracket 25 by a central pivot 30. Thus, the swivel bracket 27 along with the tubes 1 and 2 can be pivoted relative to bracket 25 from a vertical support position as shown in FIG. 1 to a generally horizontal storage position, as shown by the dashed lines in FIG. 2.

To retain the jack in both the vertical support position and the horizontal storage position a locking mechanism is provided, which takes the form of a wire form locking member 31, which is connected to the mounting bracket 27. As shown in FIG. 6, swivel bracket 27, in the flat state before bending, includes a pair of oval shaped openings 32 and the flanges 28 are formed in bracket 27 by bending along the lines 33, which extend through the oval openings 31. In the bent condition the openings 31 are located in the corners of the bracket.

Locking member 31 includes a horizontal lower section 34 which extends through the openings 32 and an elongated central section 35 extends upwardly from the upper section, as best shown in FIG. 1. An upper generally horizontal section 36 projects from the upper end of central section 35 in a direction toward the bracket 25. Sections 35 and 36 are located in a plane which extends normal to the axis of the upper section 34, as shown in FIG. 4.

To lock the jack relative to the tongue bracket 25, the upper section 36 projects through a hole 37 in extension 29 as well as through an aligned hole 38 in tongue bracket 25. By extending the upper section 36 through the hole 37 in extension 29, additional reinforcement is provided which will prevent bending or deformation of bracket 25.

The locking member 31 is biased to the locking position by a torsion spring 39 which is mounted on the free end of the section 34 of the locking member. One end of the spring 39 is secured within a hole in flange 28 of bracket 27, while the opposite end of the spring is engaged with a hole in the end of section 34 of locking member. With this construction, the force of the torsion spring will urge the locking member 31 to the locked position.

After the trailer tongue has been attached to a hitch on the vehicle, the inner tube 2 and caster wheel 5 can be elevated to move the wheel out of contact with the ground. The jack can then be pivoted to the horizontal storage position by initially releasing locking member 31. This is accomplished by pulling outwardly on central section 35 to disengage the section 36 from holes 37 and 38. With the locking member 31 released, the jack can then be pivoted to the horizontal position and the locking member 31 can then engage one of two holes 42 and 43 in bracket 25, depending upon the direction of rotation of the jack, to thereby retain the jack in the horizontal position.

The locking mechanism provides for one-hand operation in which the locking member 31 can be released and the jack can then be rotated with one hand. This is a substantial advantage over jacks as used in the past which required two hand operation for release of the locking member and rotation of the jack to the storage position.

Various modes of carrying out the invention are contemplated as being within the scope of the following claims, particularly pointing out and distinctly claiming the subject matter which is regarded as the invention.

We claim:

1. An improved trailer tongue jack, comprising an outer tube, an inner tube mounted for sliding movement within the outer tube, a terrain engaging member connected to the lower end of the inner tube and adapted to support the jack on the terrain, a nut secured to the upper end portion of the inner tube, an elongated screw mounted coaxially within the inner tube and engaged with the nut, an operating handle, bevel gear means interconnecting the handle and the screw, said bevel gear means including a first bevel gear connected to the screw and a second bevel gear engaged with the first bevel gear and connected to the handle, the improvement comprising a support member disposed in the upper end of the outer tube and having a bottom surface to support said first bevel gear and having an aperture in said bottom surface to rotatably support an end of said screw, said support member also including a cylindrical side wall to support said second bevel gear, said support member having an upper surface and said side wall having a pair of aligned openings to receive said handle, said handle having an abutment, and a retaining member disposed in said outer tube and supported on said upper surface, said retaining member having a depending tab engaged with said abutment to prevent said handle from being displaced from said aligned openings.

2. The jack of claim 1, wherein said support member is composed of a polymeric material, said handle being in direct contact with the portion of said support member bordering said openings and said end of said screw being in direct contact with the portion of said support member bordering said aperture.

3. The jack of claim 1, wherein said screw has an upwardly facing shoulder, and said jack includes a thrust washer disposed between said shoulder and said bottom surface.

4. The jack of claim 1, wherein said side wall has an internal flat to support said second bevel gear.

5. The jack of claim 1, wherein said support member is composed of polymeric material.

6. The jack of claim 1, wherein said handle is provided with a circumferential groove that defines said abutment.

7. The jack of claim 5, wherein said groove is disposed in the portion of the handle that is located within said support member.

8. The jack of claim 1, wherein said bevel gears are each provided with a non-circular opening and said handle and said screw have non-circular configurations to be received within the respective non-circular openings in the bevel gears.

9. An improved trailer tongue jack, comprising an outer tube, an inner tube mounted for sliding movement within the outer tube, a terrain engaging member connected to the lower end of the inner tube and adapted to support the jack on the terrain, a nut secured to the upper end portion of the inner tube, an elongated screw mounted coaxially within the inner tube and engaged with the nut, an operating handle, bevel gear means interconnecting the handle and the screw, said bevel gear means including a first bevel gear connected to the screw and a second bevel gear engaged with the first bevel gear and connected to the handle, the improvement comprising a cup shaped member disposed in the upper end of the outer tube and having a bottom surface to support said first bevel gear and having a flat on the inner surface of the side wall to support the second bevel gear, said cup member having a upper surface and having a pair of aligned openings to receive the handle, a retaining member mounted on the upper surface and having a downwardly extending tab, said tab having an open-ended notch, a portion of said handle located within said cup member having a circumferential groove, said notch being engaged with said groove to prevent axial displacement of said handle from said openings.

10. An improved trailer tongue jack, comprising an elongated outer tube, an inner tube disposed within the outer tube and mounted for sliding movement relative to the outer tube, terrain engaging means connected to the lower end of the inner tube, means for moving the inner tube axially of said outer tube, a first bracket secured to the outer tube, a second bracket to be secured to a trailer tongue, pivot means for mounting the first bracket for pivotal movement relative to the second bracket around a horizontal axis, and locking means for locking the first bracket to the second bracket, said locking means comprises a locking member having a first generally horizontal end portion pivotally connected to said first bracket and further comprising a central portion having a first end connected to said first end portion and having a second end, said locking member also including a second end portion connected to the second end of the central portion, an aperture in said second bracket to receive the second end portion of said locking member, and biasing means interconnecting the locking member and the first bracket for biasing the second end portion into engagement with said aperture.

11. The jack of claim 10, wherein said first bracket includes a pair of spaced vertical flanges secured to said outer tube, said flanges having aligned holes therein, the first end portion of said locking member being mounted for pivotal movement within said aligned holes.

12. The jack of claim 10, wherein said second and third portions of said locking member lie in a plane disposed normal to said first portion of said locking member.

13. The jack of claim 10, wherein said biasing means comprised a torsion spring mounted on said first end portion of the locking member, said torsion spring having one end connected to first bracket and having a second end connected to said locking member.

14. The jack of claim 10, and including an extension on said first bracket and disposed normal to said flanges, said extension having a hole disposed in alignment with the aperture in said second bracket.

15. An improved trailer tongue jack, comprising an outer tube, an inner tube mounted for sliding movement within the outer tube, terrain engaging means connected to the lower end of the inner tube and adapted to support the jack on the terrain, a nut secured to the upper end portion of the inner tube, an elongated screw mounted coaxially within the inner tube and engaged with the nut, an operating handle, bevel gear means interconnecting the handle and the screw, said bevel gear means including a first bevel gear connected to the screw and a second bevel gear engaged with the first bevel gear and connected to the handle, a support member disposed in the upper end of the outer tube and having a bottom surface to support said first bevel gear and having an aperture in said bottom surface to rotatably support an end of said screw, said support member also including a cylindrical side wall to support said second bevel gear, said support member having an upper surface and said side wall having a pair of aligned openings to receive said handle, said handle having an abutment, a retaining member disposed in said outer tube and supported on said upper surface, said retaining member having a depending tab engaged with said abutment to prevent said handle from being displaced from said aligned openings, a first bracket secured to the outer tube, a second bracket to be secured to a trailer tongue, pivot means for mounting the first bracket for pivotal movement relative to the second bracket around a horizontal axis, locking means for locking the first bracket to the second bracket, said locking means comprises a locking member having a first generally horizontal end portion pivotally connected to said first bracket and having a central portion extending upward from said first portion, said locking member also including a second end portion connected to the upper end of the central portion, an aperture in said second bracket to receive the second end portion of said locking member, and biasing means interconnecting the locking member and the first bracket for biasing the second end portion into engagement with said aperture.

* * * * *